(12) United States Patent
Koslow

(10) Patent No.: US 7,276,098 B2
(45) Date of Patent: Oct. 2, 2007

(54) TANGENTIAL IN-LINE AIR FILTER

(75) Inventor: Evan E. Koslow, Weston, CT (US)

(73) Assignee: KX Technologies, LLC, Orange, CT (US)

(*) Notice: Subject to any disclaimer, the term of this patent is extended or adjusted under 35 U.S.C. 154(b) by 0 days.

(21) Appl. No.: 10/966,688

(22) Filed: Oct. 15, 2004

(65) Prior Publication Data

US 2005/0081712 A1  Apr. 21, 2005

Related U.S. Application Data

(60) Provisional application No. 60/512,406, filed on Oct. 17, 2003.

(51) Int. Cl.
*B01D 29/54* (2006.01)

(52) U.S. Cl. .......... 55/385.3; 55/482; 55/521; 96/108; 96/135; 96/147

(58) Field of Classification Search .......... 55/385.1, 55/385.3, 385.4, 521, 528, 385.2, 482; 95/90, 95/143, 146, 273; 96/108, 134, 135, 147, 96/153, 154; 123/518, 519
See application file for complete search history.

(56) References Cited

U.S. PATENT DOCUMENTS

| | | | | |
|---|---|---|---|---|
| 2,038,071 A | * | 4/1936 | Wilhelm | 96/118 |
| 3,293,830 A | * | 12/1966 | McKinlay | 96/380 |
| 4,234,326 A | * | 11/1980 | Bailey et al. | 96/154 |
| 4,289,513 A | * | 9/1981 | Brownhill et al. | 96/135 |
| 5,628,819 A | | 5/1997 | Mestemaker et al. | |
| 5,632,793 A | * | 5/1997 | Haggard | 55/498 |
| 5,792,513 A | * | 8/1998 | Koslow et al. | 427/195 |
| 5,912,368 A | | 6/1999 | Satarino et al. | |
| 6,379,437 B1 | * | 4/2002 | Heinonen et al. | 96/135 |
| 6,432,179 B1 | | 8/2002 | Lobovsky et al. | |
| 6,464,761 B1 | * | 10/2002 | Bugli | 96/135 |
| 6,511,599 B2 | * | 1/2003 | Jaroszczyk et al. | 210/493.5 |
| 6,905,536 B2 | | 6/2005 | Wright | |
| 6,946,012 B1 | * | 9/2005 | Miller et al. | 55/521 |
| 2001/0052224 A1 | * | 12/2001 | Gelderland et al. | 55/521 |
| 2002/0029693 A1 | * | 3/2002 | Sakakibara et al. | 96/134 |
| 2002/0073847 A1 | * | 6/2002 | Sheline et al. | 95/143 |

(Continued)

FOREIGN PATENT DOCUMENTS

EP  1 021 239 B1  11/2002

(Continued)

*Primary Examiner*—Robert Hopkins
(74) *Attorney, Agent, or Firm*—DeLio & Peterson, LLC; Robert Curcio

(57) ABSTRACT

A tangential air filter configuration is designed for applications where there is a potential for a pollutant to back flush out. The tangential in-line air filter reduces air resistance and prevents back flow, allowing the air to traverse through a forced air system during operation without resistance, and absorbs particulates and prevents back flow of fuel vapors when the forced air is at a standstill. The filter medium has a plurality of pleats or corrugations with a longitudinal axis parallel to the forced airflow direction. A diffusion barrier is formed when the forced air is at a standstill. Vapors are not passed or forced through the filter medium; rather pollutants are aggressively absorbed during diffusion.

10 Claims, 2 Drawing Sheets

U.S. PATENT DOCUMENTS

| | | |
|---|---|---|
| 2002/0078828 A1* | 6/2002 | Kishkovich et al. .......... 96/108 |
| 2003/0041733 A1* | 3/2003 | Seguin et al. ................. 96/108 |
| 2003/0145732 A1* | 8/2003 | Leffel et al. .................. 96/134 |
| 2003/0192512 A1* | 10/2003 | Luley et al. ................ 123/519 |
| 2004/0011197 A1* | 1/2004 | Wernholm et al. ............ 95/90 |
| 2004/0065197 A1* | 4/2004 | LaBarge et al. .............. 95/90 |
| 2004/0099253 A1* | 5/2004 | Tschantz .................... 123/518 |
| 2004/0112219 A1* | 6/2004 | Leffel et al. .................. 96/108 |

FOREIGN PATENT DOCUMENTS

| | | | |
|---|---|---|---|
| JP | 52-114473 A | * | 9/1977 |
| JP | 53-1176 A | * | 1/1978 |
| JP | 54-65213 A | * | 5/1979 |
| JP | 56-32072 A | * | 4/1981 |
| JP | 63-315126 A | * | 12/1988 |

* cited by examiner

TANGENTIAL IN-LINE AIR FILTER

This application claims priority to a provisional application, Ser. No. 60/512,406 filed on Oct. 17, 2003.

This invention is directed to a tangential in-line air filter that effectively reduces air resistance and prevents back flow, and more specifically to an engine air intake filter that allows the air to traverse through the engine during operation without resistance, and absorbs particulates and prevents back flow of fuel vapors when the engine is at a standstill.

SUMMARY OF THE INVENTION

The present invention is directed to a tangential in-line air filter configured for minimum air resistance during forced airflow operation and for optimum particulate interception by diffusion, the tangential in-line air filter comprising: a filter housing placed in-line within a forced airflow system; a filter medium within the filter housing in flow communication with the forced airflow system, the filter medium having a plurality of pleats or corrugations with a longitudinal axis parallel to the forced airflow direction; wherein the filter medium absorbs substantially all pollutants or particulates during diffusion when the airflow is not forced through the filter medium, and releases the particulates or pollutants when the airflow is forced tangentially through the filter medium. The filter medium may be spirally wound within the filter housing. The filter may include: an inner filter medium surrounding a center annulus; an outer filter medium peripherally surrounding the inner filter medium; and a support tube separating the inner filter medium from the outer filter medium; wherein the inner and outer filter mediums have a longitudinal axis parallel to the airflow direction. The filter medium comprises a low energy absorbent material, a flat sheet activated carbon, PLEKX® material, a wood-based activated carbon, or a wood-based activated carbon with high butane capacity. The carbon may be pulverized into a small mesh.

In a second aspect, the present invention is directed to a method of eliminating back-flush pollutants in a forced air system comprising: installing a filter in-line and in flow communication with the force air, the filter having a filter medium with pleats or corrugations situated tangential to airflow direction, wherein the filter medium absorbs substantially all pollutants or particulates during diffusion when the airflow is not forced through the filter medium, and releases the particulates or pollutants when the airflow is forced tangentially through the filter medium.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

DETAILED DESCRIPTION OF THE PREFERRED EMBODIMENT(S)

Figure 1:
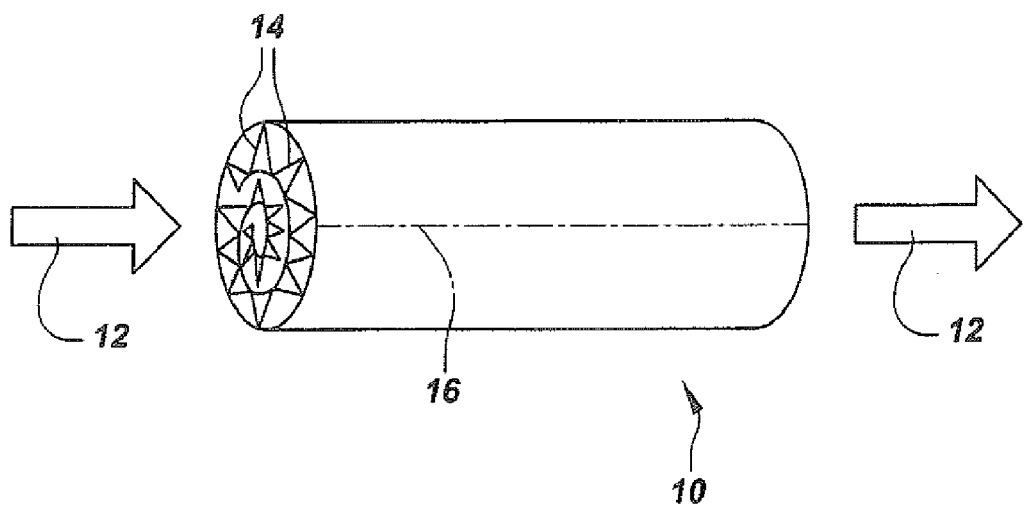
FIG. 1 is a side view of an engine air filter cartridge of the present invention with directional lines indicating airflow when the engine is operating.

In describing the preferred embodiment of the present invention, reference will be made herein to FIGS. 1–3 of the drawings in which like numerals refer to like features of the invention. Features of the invention are not necessarily shown to scale in the drawings.

The air filter of the present invention is designed to operate in an engine in two modes. The first mode initiates when the engine is in operation, and the second mode initiates when the engine is turned off. During engine operation, the engine forcibly moves air at high speed through the filter. The filter preferably comprises a corrugated or pleated medium. Importantly, the filter's corrugations or pleats are positioned tangentially to, or parallel with, the direction of the airflow. Consequently, the engine's forced air passes along the filter, traversing by and between the corrugations or pleats, and not through them. Since the air is forced rapidly through the tangentially positioned filter, insubstantial filtration occurs while the engine is on. Due to the rapid movement of airflow, there is little time for the filter to accomplish any measurable diffusion. The tangential configuration of the design allows the air to rush through the filter unimpeded. Thus, during the first mode of operation, where the engine forcibly moves air through the filter, the tangentially situated filter does not exhibit any effective airflow resistance.

When the engine is at a standstill, there is no bulk convective moment of air through the filter. For example, the air inside an engine's carburetor, which is usually filled with fuel vapors, will begin to evaporate the vapors; however, since this air reaches the filter without any mass transfer, only diffusion is realized. The air diffuses slowly towards the filter. At this low rate of diffusion, the air does not readily pass through the filter since it is in touch with the filter medium. Thus, there is copious time available for the hydrocarbons in the fuel vapor to be effectively and efficiently intercepted and absorbed in the filter medium through diffusion into a filter absorbent. A diffusion barrier is formed when the engine is at a standstill. Importantly, the vapors are not passed or forced through the filter paper; but instead hydrocarbons are aggressively absorbed during diffusion.

After the hydrocarbons have been intercepted and absorbed, and the engine is turned-on, air is again forced through the filter. This forced air sweeps the filter medium and releases the absorbed material back into the air. The hydrocarbons are then desorbed and ultimately burned by the engine. Since mass transfer occurs at this stage, any material in the filter medium that was poorly absorbed is transferred back to the air, free of hydrocarbons.

The filter's two modes of operation perform consecutive steps of diffusive absorption and release of absorbed material. The tangential placement of the filter medium relative to the airflow promotes free flow during forced air operation without air resistance. By not passing air through the filter medium during the forced air operational mode, such as when the engine is operating, filter-generated air resistance is no longer a factor impeding engine performance. Thus, for an engine inline filter, there is no drag on the engine air intake.

Figure 2:
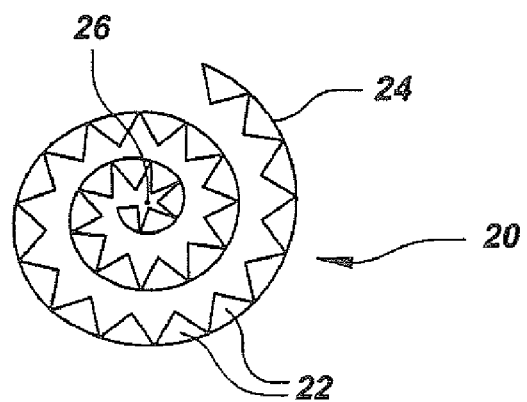
FIG. 2 depicts a top-level view of a spiral filter medium of the present invention.

FIG. 1 is a side view of an exemplary embodiment of an engine air filter cartridge 10 of the present invention with directional lines 12 indicating airflow when the engine is operating. As shown, the filter includes a series of pleats 14 with a longitudinal axis 16 tangential with or parallel to the direction of the airflow 12. The filter cartridge preferably includes an air filter medium suitable for engine intake air applications and may be made of resin bonded cellulosic filter medium or a synthetic medium manufactured from polymeric fibers. The filter medium selected should be able to absorb the vapors with modest absorption energy such that when the engine is turned on, the filter is capable of reversibly desorbing the accumulated hydrocarbons back into the air where they may combust within the engine. Consequently, a low energy absorbent filter medium is preferred. The filter cartridge 10 may also be a flat sheet activated carbon filter medium such as PLEKX®, commercially available from KX Industries, L.P., Orange, Conn. Other flat sheet filter medium made in accordance with U.S. Pat. No. 5,792,513 may be used as well. Preferably, the filter medium should be capable of immobilizing a suitable absorbent, and the absorbent should not absorb the vapors irreversibly.

In another exemplary embodiment, the filter medium may include an activated carbon, a wood-based activated carbon, or a wood-based activated carbon with high butane capacity. Importantly, the filter medium absorbs components of the air, such as fuel vapor compositions, and readily desorbs the components. Such material is commonly optimized for evaporative loss control devices (ELCDs). Furthermore, since air is not passing through the carbon during forced airflow operation through the tangentially mounted filter, the carbon may be much more deeply pulverized into a small mesh. If the filter were not tangentially situated, a deeply pulverized mesh of carbon would greatly increase air resistance and impede the airflow. By allowing the carbon to be pulverized into a small mesh, greater absorption is promoted since the diffusion into a small carbon mesh is much more efficient than into larger lumps of carbon. Therefore, utilizing pulverized carbon enhances the effective diffusive filtering without adding to the air resistance.

It should further be noted that the tangential air filter configuration of the present invention is best designed for any application where there is a potential for a pollutant to back flush out, such as inline applications in nuclear reactors, chemical reactors, fermenting operations, engines, process reactor vessels that contain fumes of gases, and other vent filter applications.

The filter medium is preferably a pleated, corrugated, or monolithic structure, tangentially mounted with respect to the airflow. A pleated or corrugated particulate air filter medium provides maximum surface area for diffuse air to interact with, while providing the lowest possible pressure drop. This configuration is easily adaptable for filtering raw air entering an engine air assembly prior to the air entering an internal combustion engine.

Generally, any monolithic structure that presents a surface to allow vapors to diffuse into the medium may be employed. The filter medium is then packed within its container, and the container is mounted such that the longitudinal axis of the filter medium is parallel to the direction of the airflow. As depicted in FIG. 2, one embodiment of the filter medium 20 may be spiral pleated or corrugated. Pleats 22 are shown attached to, or formed with, a backing 24, which is spirally wound about a center 26. The filter medium is preferably located within a cylindrical container and placed inline with the airflow. The spiral wound medium may be netted and placed in the cylindrical housing or other shaped housing means such that the filter medium retains its shape and can be easily inserted into the air pathway. Since the filter is a tangential cross-flow device, it will provide substantially no airflow resistance when the engine is operating, while providing an effective adsorbent structure to capture the fuel vapors slowly diffusing out of the engine when the engine is shut off.

Figure 3:
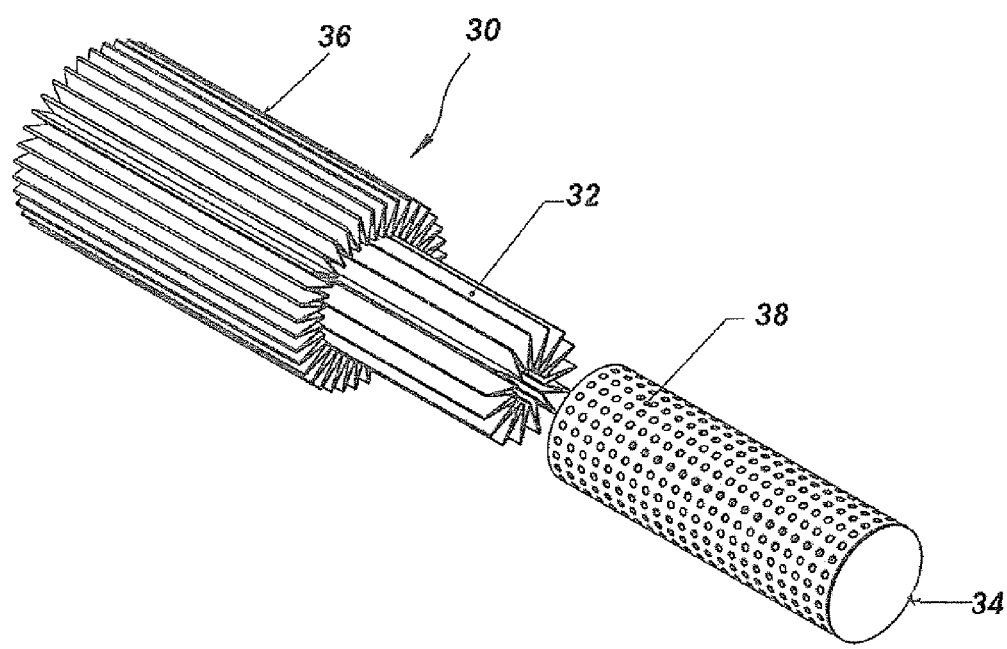
FIG. 3 is a top-level view of a double corrugated filter medium of the present invention.

In another exemplary embodiment, FIG. 3 depicts a top-level view of a double corrugated filter medium 30 for the present invention. An inner or central filter pack 32 surrounds a center annulus 34, which may be closed at the ends using an adhesive, plug, or other sealant or blocking device. An outer filter pack 36 peripherally surrounds the inner filter pack, and is separated from the inner filter pack 32 by a support tube 38. Other suitable spacers may be employed to separate the inner filter medium from the outer filter medium. Importantly, the pleats of the filter medium are aligned such that their longitudinal axis is parallel to the direction of the airflow. This design provides for maximum surface area exposure of the filter medium for the absorption of diffuse air.

The present invention provides an apparatus and method for reducing emissions of internal combustion engines and other applications where it is necessary to reduce the level of pollutants that may back flush out.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A tangential in-line air filter configured for minimum air resistance during forced airflow operation and for optimum particulate interception by diffusion, said tangential in-line air filter comprising:
   a filter housing placed in-line within a forced airflow system;
   a filter medium within said filter housing in flow communication with said forced airflow system, said filter medium having a plurality of pleats or corrugations with a longitudinal axis parallel to said forced airflow direction, said filter medium including:
      an inner filter medium surrounding a center annulus, said inner filter medium having at least one end blocked or sealed;
      an outer filter medium peripherally surrounding said inner filter medium; and
      a support tube separating said inner filter medium from said outer filter medium;
         wherein said inner and outer filter mediums have a longitudinal axis parallel to said airflow direction;
   wherein said filter medium absorbs substantially all pollutants or particulates during diffusion when said airflow is not forced through said filter medium, and releases said particulates or pollutants when said airflow is forced tangentially through said filter medium.

2. The tangential in-line air filter of claim 1 wherein said center annulus includes a blocking device on said at least one end to prevent airflow therethrough.

3. The tangential in-line air filter of claim 2 wherein said blocking device includes an adhesive, plug, or sealant.

4. The tangential in-line air filter of claim 1 wherein said filter medium comprises a low energy absorbent material.

5. The tangential in-line air filter of claim 1 wherein said filter medium includes a flat sheet activated carbon.

6. The tangential in-line air filter of claim 5 wherein said carbon is pulverized into a small mesh.

7. The tangential in-line air filter of claim 1 wherein said filter medium includes a wood-based activated carbon, or a wood-based activated carbon with high butane capacity.

8. The tangential in-line air filter of claim 1 wherein said filter medium includes a flat sheet composite.

9. A method of eliminating back-flush pollutants in a forced air system comprising: installing a filter in-line and in flow communication with forced air from said forced air system, said filter having a filter medium with pleats or corrugations situated tangential to airflow direction, said filter medium including an inner filter medium surrounding a center annulus, said inner filter medium having at least one end blocked or sealed, an outer filter medium peripherally surrounding said inner filter medium, and a support tube separating said inner filter medium from said outer filter medium, wherein said inner and outer filter mediums have a longitudinal axis parallel to said airflow direction, and wherein said inner and outer filter mediums absorb substantially all pollutants or particulates during diffusion when airflow is not forced through said filter mediums, and releases said particulates or pollutants when airflow is forced tangentially through said filter mediums.

10. The method of claim 9 wherein said filter is installed in-line in forced air systems in nuclear reactors, chemical reactors, fermenting operations, engines, process reactor vessels that contain fumes of gases, or vent filter applications.

* * * * *

UNITED STATES PATENT AND TRADEMARK OFFICE
CERTIFICATE OF CORRECTION

PATENT NO. : 7,276,098 B2 Page 1 of 1
APPLICATION NO. : 10/966688
DATED : October 2, 2007
INVENTOR(S) : Evan E. Koslow It is certified that error appears in the above-identified patent and that said Letters Patent is hereby corrected as shown below:

Column 3, Line 16:

"KX Industries, L.P., Orange, Conn." should be -- KX Technologies LLC, Orange, Conn. --.

Signed and Sealed this

Eighth Day of April, 2008

JON W. DUDAS
*Director of the United States Patent and Trademark Office*